United States Patent [19]

Messenger et al.

[11] Patent Number: 5,004,248
[45] Date of Patent: Apr. 2, 1991

[54] UNITIZED SEAL WITH UNITIZING JOINT REMOTE FROM SEAL LIP

[75] Inventors: Edward J. Messenger; George Fedorovich, both of Longview, Tex.

[73] Assignee: Garlock Inc., Palmyra, N.Y.

[21] Appl. No.: 526,285

[22] Filed: Aug. 25, 1983

[51] Int. Cl.$^5$ .................................................. F16J 15/34
[52] U.S. Cl. ........................................ 277/37; 277/50; 277/153
[58] Field of Search ............... 277/50, 84, 152, 153, 277/37, 39

[56] References Cited

U.S. PATENT DOCUMENTS

| | | | |
|---|---|---|---|
| 2,089,462 | 8/1937 | Winter | 277/50 |
| 2,804,324 | 8/1957 | Stallings | 277/153 |
| 3,021,161 | 2/1962 | Rhoads et al. | 277/153 X |
| 3,022,081 | 2/1962 | Kosatka . | |
| 3,099,454 | 7/1963 | Walinski | 277/153 X |
| 3,275,333 | 9/1966 | Scott et al. . | |
| 3,341,264 | 9/1967 | Otto | 277/153 X |
| 3,363,911 | 1/1968 | McKinnen | 277/153 X |
| 3,479,728 | 11/1969 | Burfield et al. . | |
| 3,495,843 | 2/1970 | Andersen et al. | 277/153 X |
| 4,037,849 | 7/1977 | Thumm | 277/153 X |
| 4,252,329 | 2/1981 | Messenger | 277/153 X |
| 4,258,927 | 3/1981 | Cather | 277/152 |
| 4,283,063 | 8/1981 | Prescott | 277/153 X |
| 4,336,945 | 6/1982 | Christiansen et al. | 277/153 |

FOREIGN PATENT DOCUMENTS

| | | | |
|---|---|---|---|
| 54-135458 | 10/1979 | Japan | 277/153 |
| 870813 | 10/1981 | U.S.S.R. | 277/152 |
| 590874 | 7/1947 | United Kingdom | 277/152 |
| 1034756 | 7/1966 | United Kingdom | 277/153 |

Primary Examiner—William A. Cuchlinski, Jr.
Attorney, Agent, or Firm—Sixbey, Friedman & Leedom

[57] ABSTRACT

A unitized seal includes a unitizing joint which is remotely spaced from a seal lip. The seal requires only two stampings with one elastomeric element bonded to one of the stampings. The remaining stamping forms a one piece wear sleeve having a first section with a wear surface which is engaged by a seal lip formed on the elastomeric element to provide a seal. A second section of this stamping extends angularly away from the wear surface and includes a terminal end which cooperates with the elastomeric element bearing stamping to form the unitizing joint.

26 Claims, 3 Drawing Sheets

UNITIZED SEAL WITH UNITIZING JOINT REMOTE FROM SEAL LIP

TECHNICAL FIELD

The present invention relates to unitized seals generally, and more particularly to a novel unitized seal structure designed to reduce the possibility of damage to the sealing lip during either assembly or installation of the unitized seal.

BACKGROUND ART

For a large number of seal uses, it has proven to be beneficial to employ a unitized seal wherein a seal is combined with a wear sleeve in a single unitized assembly. The incorporation of a good wear surface into a seal assembly to form a unitized unit has resulted in both increased seal life and shaft life for many shaft seal applications and is even more important with the development of lined seals to protect the seal lip to wear sleeve interface from damage prior to installation, during installation and during removal. This allows the design and choice of materials to be selected for best application performance without the need to consider possible disassembly damage. This has led to the development of a substantial number of unitized seal constructions.

Some prior art unitized seals incorporate a unitized structure wherein the wear sleeve members are formed from a plurality of nested parts which are locked together. These seal units have tended to leak in the area between the nested metal members and have often required the use of additional gasket material to reduce such leakage. Attempts have been made to design more reliable unitized seals having wear sleeves formed from nested parts which do not require additional gasket material as illustrated by U.S. Pat. Nos. 3,275,333 to A.M. Scott et al and 3,479,728 to P.C. Burfield et al. These seal designs do effectively reduce the expense previously incurred in providing gaskets between the wear sleeve sections of a multi-part unitized seal, but such seals still require additional expense for the formation of the plurality of seal parts used in the assembly. These parts must be individually stamped or molded, and often three or more stamped components and a plurality of molding operations are necessitated for the formation of a single unitized seal.

With many known unitized seals, the seal structure is such that the seal is easily damaged during assembly or disassembly. Often the unitizing joint for the seal is located in close proximity to the elastomeric seal lip, thereby exposing the seal lip to possible damage by contact with the seal unitizing joint during seal assembly or disassembly. U.S. Pat. No. 3,022,081 to T.O. Kostaka illustrates a unitized seal which may be easily disassembled by deflecting the rubber seal element. However, in some instances, the seal element might become exposed to sharp metal edges of metal seal components during this disassembly operation, and damage to the seal contact surface is thereby possible, and in the case of lined seals, likely. Consequently, a need has arisen for the development of a simple, inexpensive unitized seal structure designed to reduce the possibility of damage to a sealing lip during either assembly, disassembly or installation of the seal.

DISCLOSURE OF THE INVENTION

It is a primary object of the present invention to provide a novel and improved unitized seal which requires only two separate stampings, one having bonded to it a molded part to form the unitized seal.

It is another object of the present invention to provide a novel and improved unitized seal wherein a unitizing joint is remotely located from a seal lip to reduce the possibility of deleterious contact between the seal lip and a portion of the unitizing joint during assembly or disassembly of the seal. The seal includes a one-piece wear sleeve having a cylindrical hub with a wear surface on that hub and an annular deflector ring extending radially outwardly from the hub wear surface. A one-piece reinforcing shell has a one-piece elastomeric element bonded thereto, and the elastomeric element includes the seal lip contacting the wear surface of the wear sleeve. The reinforcing shell includes a tail portion which forms a unitizing joint flange when rolled over, and this tail portion, which is positioned to be remote from the elastomeric seal lip, is adapted to cooperate with an outer circumferential portion of the annular deflector ring to form a unitizing joint for the seal. The unitizing joint and the elastomeric seal lip are widely separated and remote from each other, and the elastomeric seal lip is not encapsulated by the wear sleeve except in the embodiment of FIG. 5. By simply rolling over the tail portion of the reinforcing shell after the wear sleeve is positioned to form the unitizing joint, the seal assembly can be directly unitized and tamper proofed without the need of additional components or special installation tools.

A further object of the present invention is to provide a novel and improved unitized seal for a wheel assembly which permits inner and outer bearings of the wheel assembly to be removed without disturbing the unitized seal, except in the embodiment shown in FIG. 5 hereof. The unitized seal includes a one-piece elastomeric element which has a seal lip engaging a wear sleeve wear surface and elastomeric beads for engaging the bore of a hub of the wheel assembly. The wear sleeve is metal and is press fit to an axle in a manner such that less force is required to remove the beads from the hub housing than is required to remove the wear sleeve from the axle. Thus, when the wheel hub housing is removed, the unitized seal will remain in place on the axle.

Another object of the present invention is to provide a novel and improved unitized seal which includes a seal wear sleeve having a wear surface which can be controlled to reduce the effects of wear and seal irregularity on seal reliability and longevity.

Still another object of the present invention is to provide a novel and improved unitized seal in which an elastomeric element can be replaced without the use of special tools and without disturbing a wear sleeve for the seal. The unitized seal includes a snap ring in a seal unitizing joint, and with the snap ring removed, the elastomeric element can be separated from the wear sleeve and both elements may be examined and reused or replaced as appropriate.

A still further object of the present invention is to provide a novel and improved unitized seal which can be used in either oil or grease and includes a deflector ring to protect the seal from the ingress of contaminants. Fluid passages can be defined in the deflector ring if suitable.

These objects are accomplished by providing a unitized seal which includes a one-piece wear sleeve having a cylindrical hub affixed, as by a press fit, to an axle of a wheel assembly and an annular deflector ring extending radially from the sleeve cylindrical hub. The portion of the deflector ring closest to the rim of the deflector ring forms one part of a seal unitizing joint. The seal further includes a one-piece elastomeric element bonded to a one-piece reinforcing shell, and the elastomeric element has a seal lip sliding against the wear sleeve wear surface and ridges or beads engaging a hub housing. The reinforcing shell includes a tail portion on the end thereof which is remote from the elastomeric sealing lip located at the other end of the reinforcing shell. The reinforcing shell tail portion is located adjacent to the rim to form the unitizing joint with an outer peripheral portion of the deflector ring. The seal lip and the unitizing joint are thus remotely located with respect to each other.

BEST MODE FOR CARRYING OUT THE INVENTION

Figure 1:
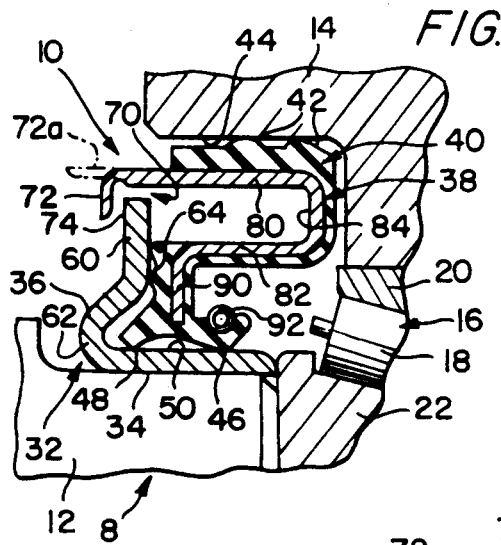
FIG. 1 is a partial longitudinal half sectional view of a wheel assembly including a first embodiment of the unitized seal of the present invention.

FIG. 1 discloses a wheel assembly indicated generally at 8 having a unitized seal 10 located between an axle 12 and a rotating hub housing 14 to prevent oil leakage from the wheel assembly. The hub housing is rotatably mounted on the axle by bearing assemblies 16, one of which is shown in FIG. 1, and includes a bearing 18 mounted in conventional bearing races 20 and 22.

The unitized seal 10 requires only two stampings and one elastomeric element. A first stamping provides a one-piece wear sleeve 32 having a cylindrical hub section 34 press fit onto the axle 12. The wear sleeve 32 includes an annular deflector ring 36 extending radially outwardly from the sleeve hub section 34.

The second stamping forms a one-piece reinforcing shell 38 having a one-piece elastomeric element 40 bonded thereto. The elastomeric element 40 includes circumferential projecting beads or ridges 42 abutting a surface 44 of the hub housing 14 for holding the seal 10 in place, and seal lips 46 and 48 engaging a wear surface 50 on the sleeve cylindrical hub 34.

The wear sleeve 32 is press fit onto axle 12 and can include press fit defining means and slip fit defining means of various types. The press fit between the wear sleeve 32 and the axle 12 is designed to affix the wear sleeve to the axle with greater force than the fit established between the bumpers 42 and the hub housing surface 44. Consequently, the hub housing 14 can be removed from the outer portion of the unitized seal 10 while leaving the unitized seal assembled and in place on the axle 12. The seal 10 remains properly positioned for reuse upon reassembly of the hub housing 14 and the wheel of the wheel assembly 8.

The annular deflector ring 36 at the opposite end of the hub 34 acts to deflect external contaminants. This deflector ring includes an upright retaining wall 60 connected to the sleeve cylindrical hub 34 by a curved knee section 62. Rings or bumpers 64 formed on the elastomeric element 40 abut the retaining wall 60 to maintain the elements of seal 10 properly positioned and oriented during installation and act as a bearing to prevent seizure caused by metal to metal contact.

A unitizing joint 70 is formed by a unitizing joint rollover portion 72 provided on one end of shell 38 to cooperate with an outer peripheral surface portion 74 of the retaining wall 60. The joint rollover portion 72 is originally a tail portion 72a of the reinforcing shell, and becomes the unitizing joint rollover portion 72 when rolled over into the position shown therefor in FIG. 1. As shown in FIG. 1, the joint rollover portion 72 and the peripheral surface portion 74 are located adjacent the upper end of the annular deflector ring, so that the unitizing joint 70 is located remotely from the seal lips 46 and 48. As can be understood from the foregoing, rolling over the reinforcing shell tail portion to form unitizing joint rollover portion 72 of the unitizing joint 70 is easily done during manufacture.

The shell element 38 is a unitary stamping and includes a U-shaped portion formed by a leg 80 connected to a leg 82 by a web portion 84. A leg 90 extends radially inwardly from the free end of the leg 82. The elastomeric element 40 is molded on the shell 38 to extend along both sides and over the end of the leg 90 and along surfaces of the legs 80 and 82 and the web 84. Thus the one piece shell 38 both supports and reinforces the elastomeric element 40 while forming a portion of the unitizing joint 70. The seal lip 46, which is the primary sealing lip and is biased by a garter spring 92, is positioned on one axial side of the leg 90, while the seal lip 48, which is an auxiliary dirt lip, is positioned on the opposite axial side of the leg 90. The seal lip 46 may be biased by a conventional finger spring instead of the garter spring 92 in a manner known in the art.

The unitizing joint rollover portion 72a is formed originally as a thinned end portion of the leg 80, and when curled or crimped as shown at 72 in FIG. 1, forms a barrier to prevent the disassembly of the wear sleeve 32 and the shell 38. The hub housing 14 may be removed from around the outer portion of the unitized seal 10 by withdrawing it to the right in FIG. 1, but the rollover portion 72 will engage surface 74, and the unitized seal will remain assembled in proper position for reuse on the axle 12. Since the unitizing joint 70 is remote from the seal lips 46 and 48, it is not possible for elements of this unitizing joint to contact and damage the seal lips during the withdrawal or repositioning of the hub housing.

Figure 2:
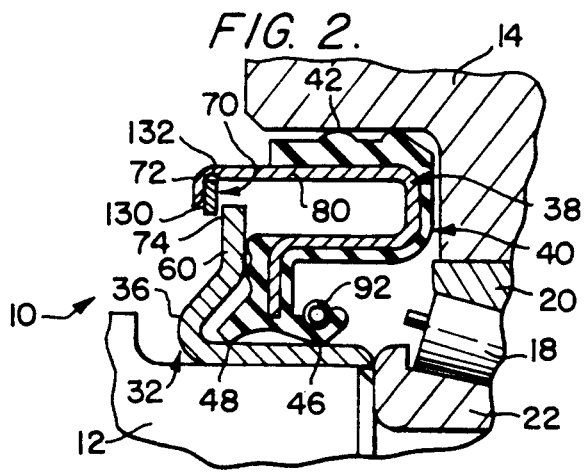
FIG. 2 is a partial longitudinal half sectional view of the wheel assembly including a modified embodiment of the unitized seal of FIG. 1 having a seal unitizing joint with a split-type unitizing ring.

In FIG. 2, the unitized seal 10 of FIG. 1 has been modified so that the rollover portion 72 does not contact surface 74 on the retaining wall 60, but instead is formed to pass freely over the end of the retaining wall. To complete the unitizing joint 70 and prevent disassembly of the wear sleeve 32 and the shell 38 when the hub housing 14 is withdrawn, a split type retaining ring 130 is removably mounted in a circular groove 132 formed at the juncture between the inner surfaces of the unitizing rollover portion 72 and the leg 80 of the shell 38. This retaining ring extends beyond or past the end of the retaining wall 60 and will contact the surface 74 thereof to maintain the unitized seal 10 assembled and in position on the axle 12. However, when the hub housing 14 is removed, it is often desirable to inspect the wear sleeve 32 and the elastomeric element 40 for wear or damage. This may be easily accomplished by removing the split type retaining ring 130 and separating the shell element 38 and elastomeric element 40 from the wear sleeve 32. The elastomeric element or wear sleeve can then be inspected and replaced if wear or damage is discovered, and the seal 10 can be reassembled and the split type ring 130 replaced to return the seal to a unitized configuration.

FIGS. 3-8 disclose modifications of the basic unitary seal 10 of FIG. 1, and like elements in these figures will be designated with the reference numerals used in FIG. 1. The unitary seals illustrated in FIGS. 3-8 all incorporate the basic novel structural features described in connection with the unitary seal of FIG. 1; namely, a first stamping which forms a wear sleeve 32, a second stamping which forms a one-piece shell 38, an elastomeric element 40 which is bonded in a single molding operation to the one-piece shell, and a unitizing joint 70 which is positioned remotely from the seal lip(s).

Figure 3:
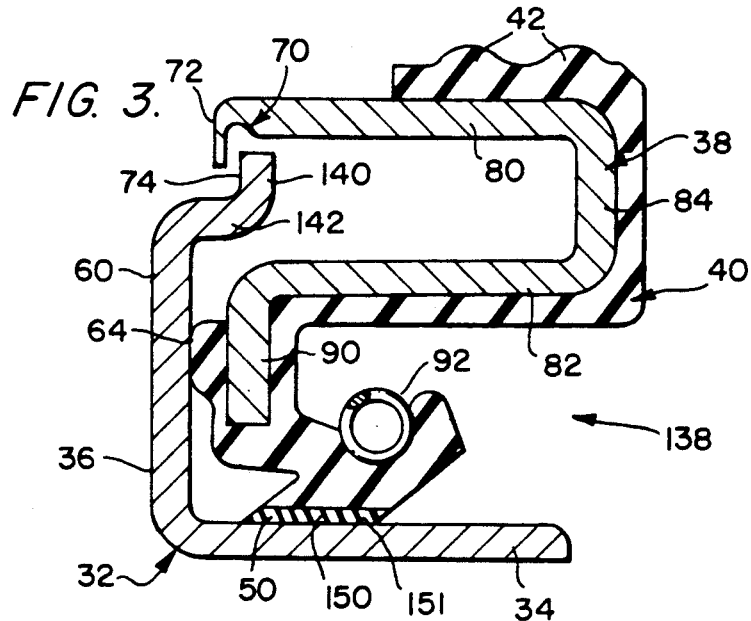
FIG. 3 is a longitudinal half sectional view of a third embodiment of the unitized seal of the present invention.

The unitized seal 138 of FIG. 3 is a spindle installed unitized seal, and the annular deflector ring 36 includes an end section 140 bearing the outer peripheral surface portion 74. The end section 140 is substantially parallel to the retaining wall 60 and is offset therefrom, by a web section 142 so as to be substantially perpendicular to the wear surface 50, and the unitizing joint 70 is thus spaced axially from the outermost surface of the retaining wall.

The elastomeric element 40 of the unitized seal 138 does not include the seal lips 46 and 48, but instead has a single seal lip 150 engaging the wear surface 50 of the wear sleeve 32. This seal lip is provided with a liner 151 of low friction resin material such as polytetrafluroethylene.

Figure 4:
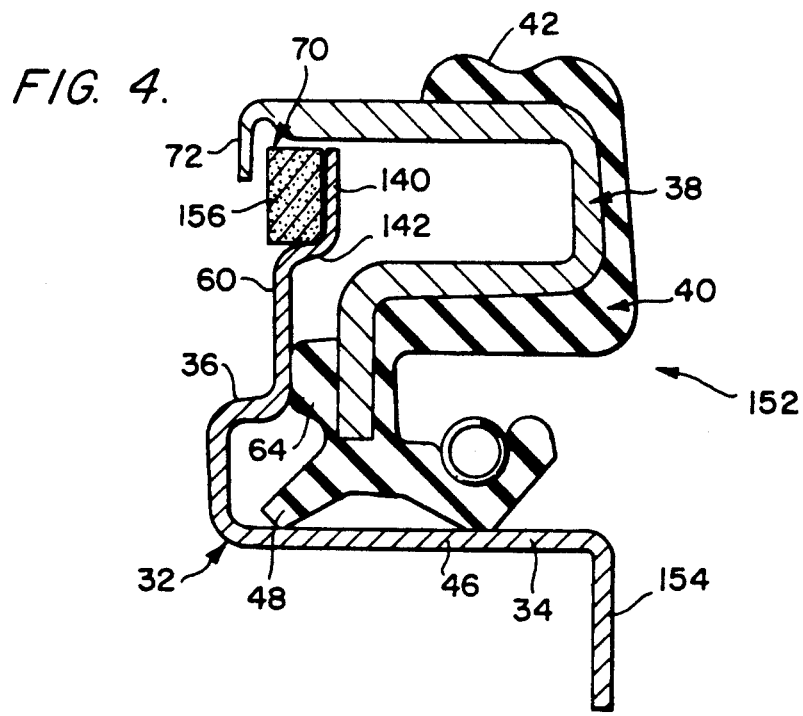
FIG. 4 is a longitudinal half sectional view of a fourth embodiment of a unitized seal of the present invention.

A unitized seal 152 is shown in FIG. 4 which may be installed upon the wheel assembly 8 of FIG. 1 without the aid of special installation tooling. This unitized seal includes a wear sleeve 32 having a cylindrical sleeve hub 34 with an annular flange 154 on one end of the sleeve hub opposite to the annular deflector ring 36. The flange 154 can be sandwiched between the end of the axle 12 and the bearing race 22 to maintain the sleeve 32 properly positioned and oriented during installation. Press fit defining means and slip fit defining means can also be used in conjunction with the sleeve 32 as indicated in connection with the unitized seal 10, and as illustrated and subsequently described in connection with FIG. 6. The press fit can be established to keep the seal 152 intact upon removal of the hub housing 14 from the axle. The deflector ring 36 includes the sections 140 and 142 as shown in FIG. 3 with section 140 forming a seat for a friction modifying material 156. The unitizing joint 70 formed for seal 152 thus includes friction modifying material 156 therein. This additional material 156 allows the seal to be installed either on the axle or in the bore first by providing a means to reposition a seal after being placed too deep into a bore.

The elastomeric element 40 for the unitized seal 152 includes a seal lip 46 of the type described in connection with the unitized seal 10 of FIGS. 2 and 2. A dust seal lip 48 is also provided.

Figure 5:
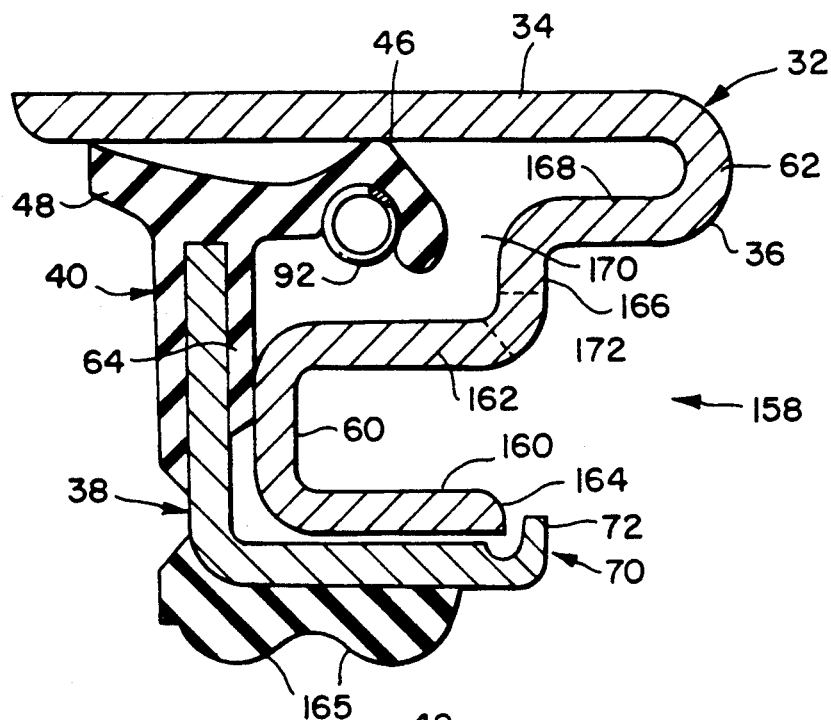
FIG. 5 is a longitudinal half sectional view of a fifth embodiment of a unitized seal of the present invention.

Shown in FIG. 5 is a unitized seal 158 which can be installed in a wheel assembly having a hub which rotates with respect to a fixed axle. The unitized seal is not affected by centrifugal forces when installed on a rotating hub, and includes a one-piece wear sleeve 32 having a cylindrical hub 34 and an annular deflector ring 36 on one end of the sleeve hub 34. The deflector ring 36 includes the retaining wall 60 which forms a web between radially inner and outer axially extending parallel legs 160 and 162 respectively. The terminal end 164 of leg 160 cooperates with unitizing joint rollover portion 72 to form the unitizing joint 70.

Leg 162 is connected by a wall section 166 to an axially extending wall section 168. Wall section 166 extends substantially parallel to the retaining wall 60, while wall section 168 extends substantially parallel to the legs 160 and 162 and is connected to the cylindrical hub 34 by knee section 62.

It should be noted that leg 162, and wall sections 166 and 168 cooperate with knee section 62 and cylindrical sleeve hub 34 to form a chamber 170 into which the seal lip 46 of the elastomeric element 40 extends. The wear sleeve 32 is reversed in the unitized seal 158 from the position shown therefor in the previous figures. Thus, the sleeve hub section is press fit into the hub while elastomeric beads 165 are provided to engage the axle. Oil vents, such as that illustrated in dotted lines at 172 may be located to extend into the chamber 170 anywhere on the leg 162, the wall sections 166 or 168, or the knee section 62.

Figure 6:
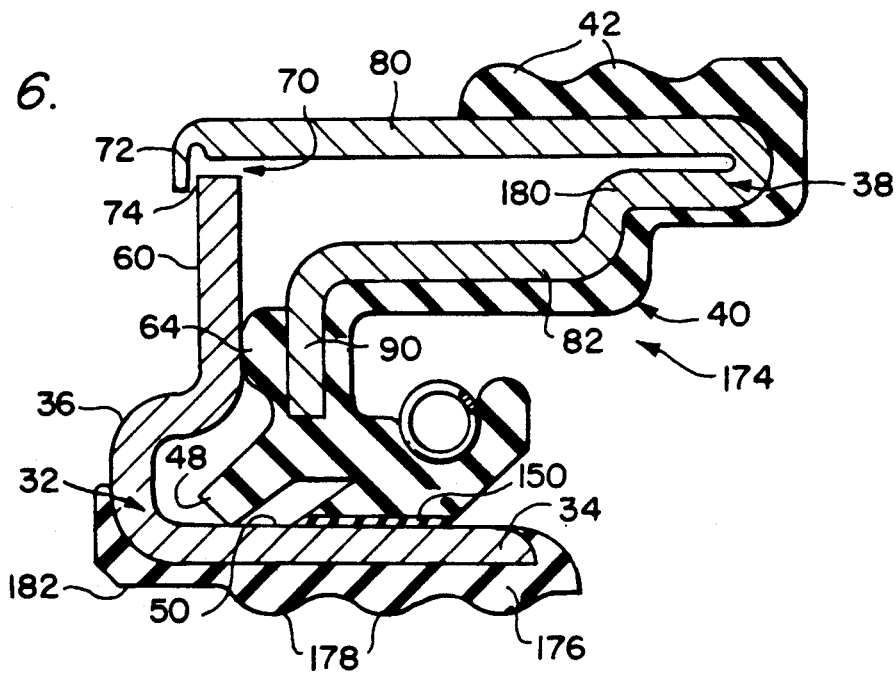
FIG. 6 is a longitudinal half sectional view of a sixth embodiment of a unitized seal of the present invention utilizing two moldings.

In FIG. 6, a unitized seal 174 is illustrated wherein the wear sleeve 32 is provided with a press fit defining unit 176 bonded to the surface thereof opposite to wear surface 50. This press fit defining unit may constitute a molded, elastomeric unit having annular ridges or beads 178 projecting therefrom to engage the axle of a wheel assembly. These beads are designed to grip the axle with a greater retaining force than that applied to the hub housing by the beads 42 of the elastomeric element 40.

The unitized seal 174 is designed to be installed by hand on the wheel assembly and thus the shell 38 is shaped to enhance such installation. In this design, the web 84 between the legs 80 and 82 of the unitized seal 10 of FIG. 1 is substantially eliminated and the length of the leg 80 is extended to bottom out in the bore causing the sleeve 32 to be positioned by contact with beads 64. The leg 82 is joined to the leg 80 by a curved section 180, and this permits the ridges or beads 42 on the elastomeric element 40 to be offset when desired to the right in FIG. 6 behind the leading beads 178 of the press fit defining unit 176. When the unitized seal 174 is installed by hand, a flat leading edge 182 of the press fit defining unit forms an initial fit with the axle 12 so that the unitized seal is properly started on the axle. Then the wear sleeve 32 can be press fit onto the axle 12 and the hub housing fit over the beads 42.

Figure 7:
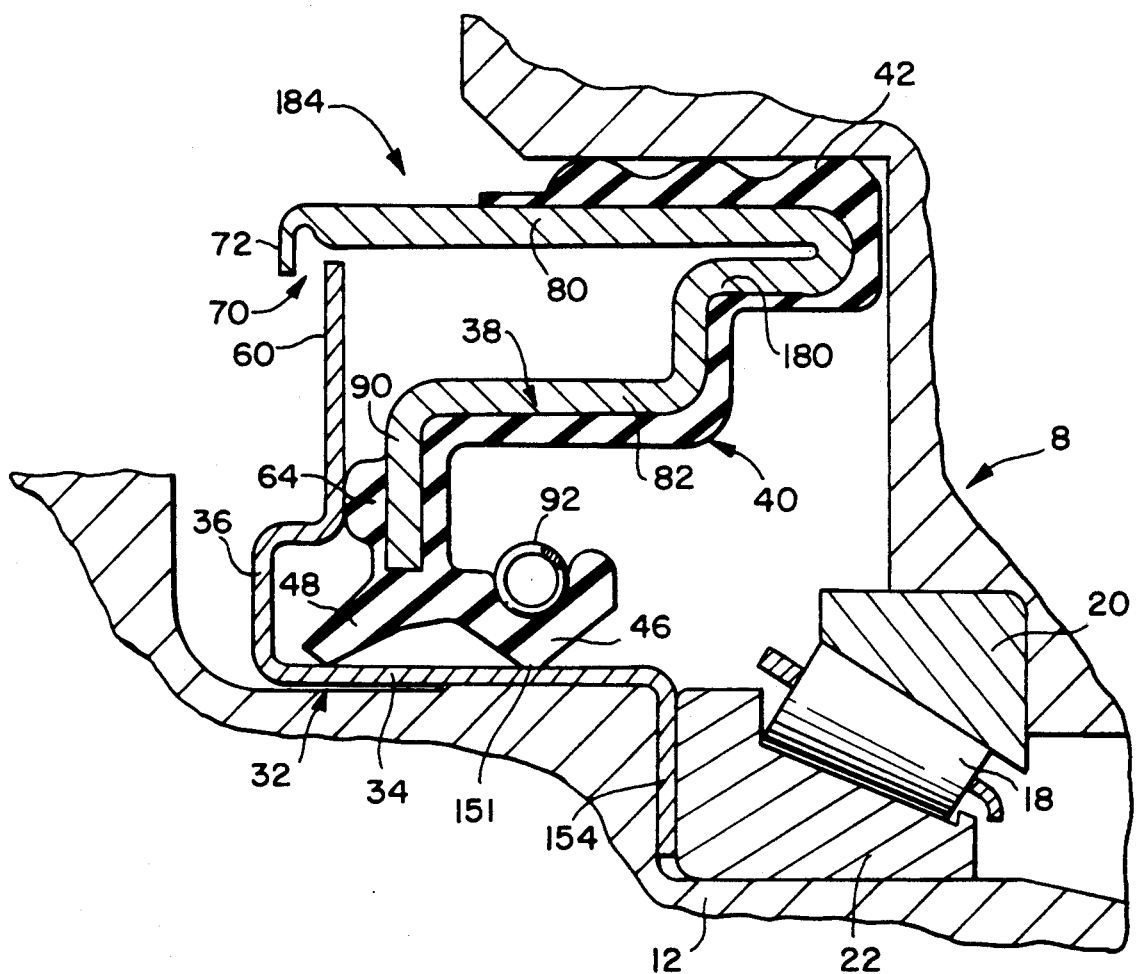
FIG. 7 is a partial longitudinal half sectional view of a wheel assembly including a seventh embodiment of a unitized seal of the present invention.

A unitized seal 184 is shown in FIG. 7 which incorporates features of the unitized seals 152 and 174 of FIGS. 4 and 6 respectively and which may be installed without special installation tooling. The cylindrical hub 34 of the wear sleeve 32 includes the flange 154 of the unitized seal 152 which is sandwiched between a shoulder 186 formed on the axle 12 and the bearing race 22. This assures the accurate orientation and positioning of the unitized seal during assembly thereof with the wheel assembly 8. To aid in the hand installation of the unitized seal 184, the one piece shell 38 described in connection with the unitized seal 174 is employed.

Figure 8:
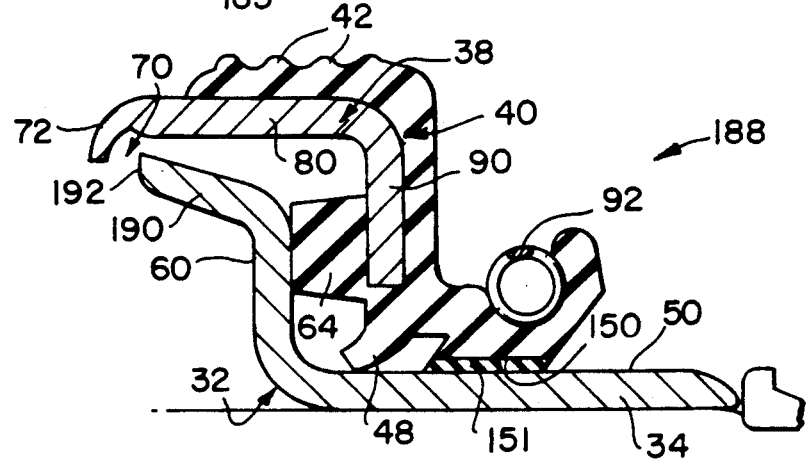
FIG. 8 is a longitudinal half sectional view of a eighth embodiment of a unitized seal of the present invention.

FIG. 8 discloses a unitized seal 188 designed for a fixed bore and rotating shaft which varies somewhat in structural configuration from the unitized seals heretofore described but which still incorporates the novel structural concept embodied in those unitized seals; namely, first and second stampings forming a wear sleeve 32 and a shell 38 respectively, an elastomeric element 40 bonded to the shell in a single molding step, and a unitizing joint 70 positioned so as to be remote from the seal lips formed on the elastomeric element.

In the unitized seal 188, the wear sleeve 32 includes a retaining wall 60 which extends outwardly from one end of the cylindrical hub 34 in a plane substantially perpendicular to that of the wear surface 50. At the upper end of the retaining wall, a flange section 190 angles outwardly away from the retaining wall toward the leg 80 of the shell 38. The end 192 of this flange section cooperates with the unitizing joint rollover portion 72 to form the unitizing joint 70.

The one piece shell 38 of the unitized seal 188 includes only the legs 80 and 90 connected in an "L" shaped configuration. The elastomeric element 40 is molded and bonded to the surfaces of the shell 38.

The unitized seals in FIGS. 1-8 are substantially annular structures, and it must be recognized that only the upper half portion of each seal is illustrated in section in the drawings. The lower portion of each seal, shown in a sectional view, would be identical to the structure shown in the drawings but would be inverted.

INDUSTRIAL APPLICABILITY

The unitized seals of the present invention are adapted for use in many applications although the seals have been shown herein primarily on wheel assemblies and spindles. The seals operate to provide an effective fluid sealing action between a first element, such as an axle or shaft, and a second element such as a wheel hub spaced therefrom, such elements being relatively rotatable. The seals are designed to grip the first element with a force greater than that applied by the seal to the second element so that the second element can be withdrawn leaving the seal intact and in position on the first element.

We claim:

1. A unitized seal for providing a sealing action between first and second relatively movable members which includes no more than two unitary stampings, comprising a one piece wear sleeve adapted to be mounted on said first member, said wear sleeve including one of said unitary stampings which includes a first section having a wear surface provided thereon and a second section extending angularly away from said first section and terminating at a terminal end portion radially spaced from said wear surface, said terminal end portion including an inner surface, an outer surface extending in spaced relation to said inner surface, and a terminal end surface extending between said inner and outer surfaces, a one piece reinforcing shell adapted for assembly with said one piece wear sleeve and including sealing means secured to said one piece reinforcing shell and adapted to engage said wear surface when said reinforcing shell is assembled with said one piece wear sleeve, said reinforcing shell being the remaining unitary stamping and a part of said reinforcing shell forming a unitizing rollover portion for engagement with the terminal end portion of the second section of said wear sleeve to form therewith a unitizing joint remote from said wear surface, said rollover portion extending above and over said terminal end surface and along the outer surface of said terminal end portion, when said reinforcing shell is operatively assembled with said wear sleeve.

2. The unitized seal of claim 1 wherein said sealing means includes an elastomeric body formed and bonded in a single molding operation too said reinforcing shell, said elastomeric body including at least one seal lip in sealing engagement with said wear surface.

3. The unitized seal of claim 1 wherein said one piece wear sleeve includes mounting means for frictionally engaging and mounting said wear sleeve on said first member and friction engaging and sealing means are mounted on said one piece reinforcing shell for frictionally engaging said second member, said friction engaging and sealing means being formed to frictionally engage said second member with a force less than the force with which said frictionally engaging and mounting means engages said first member.

4. The unitized seal of claim 1 wherein said means for forming a unitizing joint includes a split ring member removably mounted on said reinforcing shell to extend therefrom in overlapping relationship with the terminal end portion of said second section.

5. The unitized seal defined in claim 1, wherein said rollover portion is a free end portion of said remaining unitary stamping.

6. The unitized seal defined in claim 5, wherein free end portion is provided with a reduced thickness for facilitating rolling thereof from an original condition enabling assembly of said reinforcing shell with said wear sleeve to a rolled-over condition precluding disassembly thereof.

7. The unitized seal of claim 1 wherein said sealing means includes an elastomeric body secured to said reinforcing shell, said elastomeric body including at least one seal lip in sealing engagement with said wear surface, said reinforcing shell and said second section of said wear sleeve being formed to space said unitizing joint radially beyond said seal lip.

8. The unitized seal of claim 7 wherein said second section of said one piece wear sleeve includes a first surface which extends from said wear surface to the inner surface of said terminal end portion and a second surface which extends in spaced relationship to said first surface to the outer surface of said terminal end portion, said elastomeric body including a projecting bumper means for engaging said first surface when said reinforcing s hell is operatively assembled with said wear sleeve.

9. The unitized seal of claim 8 wherein said mounting means for mounting said wear sleeve on said first member includes a leading edge surface means for guiding said wear sleeve onto said first member and means located next to said leading edge surface means and projecting outwardly thereof to frictionally engage said first member.

10. A unitized seal comprising, a one-piece wear sleeve having a cylindrical hub affixed to a first element of a pair of relatively movable elements and an annular deflector extending from said cylindrical hub, said annular deflector including a peripheral edge portion spaced radially from said cylindrical hub; and an annular unitary seal means slidably engaging said wear sleeve and including a one-piece reinforcing shell having a seal element affixed thereon, said seal element including a seal lip slidably engaging said cylindrical hub, said reinforcing shell being removably mounted on a second of said pair of relatively movable elements for disassembly therefrom and including a unitizing means located adjacent to said deflector peripheral edge portion and overlapping said deflector peripheral edge portion to form a unitizing joint, said unitizing means operating to prevent disassembly of said annular unitary seal means from said one-piece wear sleeve by engaging said deflector peripheral edge portion when the second of said pair of relatively movable members is disassembled from said reinforcing shell.

11. The unitized seal defined in claim 10, wherein said unitizing means includes a retaining ring mounted on said reinforcing shell to engage said deflector ring.

12. The unitized seal defined in claim 10, further including a ring of friction modifying material positioned on said deflector ring adjacent to said unitizing means.

13. The unitized seal defined in claim 10, further including fluid passages defined in said deflector ring.

14. The unitized seal of claim 10, wherein said one-piece reinforcing shell, including said unitizing means, is formed of a single unitary stamping.

15. The unitized seal of claim 14, wherein said unitizing means is a free end portion of said single unitary stamping.

16. The unitized seal of claim 15, wherein said free end portion is provided with a reduced thickness for enabling rolling thereof from an original condition enabling assembly of said reinforcing shell with said wear sleeve to a rolled-over condition wherein said operating of the unitizing means to prevent disassembly of said wear sleeve from said annular unitary seal means will result.

17. The unitized seal of claim 10 wherein said one piece wear sleeve includes first mounting means for frictionally engaging and mounting said wear sleeve on said first element and said one piece reinforcing shell includes second mounting means for frictionally engaging said second element, said second mounting means being formed to frictionally engage said second element with a force less than the force with which said first mounting means engages said first element to permit said second element to be disengaged from said second mounting means without disturbing the frictional engagement between said first mounting means and said first element.

18. The unitized seal of claim 17 wherein said first element includes the axle of a wheel assembly and said second element includes the hub of a wheel assembly.

19. The unitized seal of claim 17 wherein said cylindrical hub includes a first surface which includes a wear surface for engagement with said seal means and a second surface extending in spaced relationship to said first surface, said first mounting means being secured to said second surface, and said one-piece reinforcing shell includes a first section having said seal element affixed thereto and a second section extending from said first section and including said unitizing means formed at a terminal end thereof, said first section extending inn spaced relationship to said annular deflector and said second section extending from said first section to said unitizing means, said unitizing means including a rollover portion extending over and in spaced relationship to the peripheral edge portion of said annular deflector and terminating in an end portion positioned in spaced relationship to said annular deflector and inwardly of the peripheral edge portion thereof to overlap said annular deflector peripheral edge portion when said annular unitary seal means is operatively assembled with said one-piece wear sleeve.

20. A unitized seal comprising, a one-piece wear sleeve having a cylindrical hub, a wear surface on said hub, and an annular deflector ring extending angularly from said cylindrical hub; a one-piece reinforcing shell having a unitary joint rollover means formed as a unitary part thereof and being located to cooperate with a portion of said deflector ring to form a unitizing joint and to engage said annular deflector ring at a point radially spaced from said cylindrical hub for preventing disassembly of said wear sleeve and said reinforcing shell; and an elastomeric element bonded to said reinforcing shell to form a sealing lip means slidably engaging said wear surface.

21. The unitized seal of claim 20 wherein said first mounting means for mounting said wear sleeve on said first element includes a leading edge surface means for guiding said wear sleeve onto said first element and means located next to said leading edge surface means and projecting outwardly thereof to frictionally engage said first element.

22. The unitized seal of claim 19 wherein said second mounting means is mounted upon the second section of said one-piece reinforcing shell, and said annular unitary seal means includes bumper means mounted upon the first section of said one-piece reinforcing shell to engage said annular deflector when said annular unitary seal means is operatively assembled with said one-piece wear sleeve.

23. The unitized seal defined in claim 22, wherein the portion of said deflector ring cooperating with said unitized joint rollover portion is located adjacent to a peripheral rim of said annular deflector ring, the unitized joint formed thereby being located remote from said sealing lip means.

24. The unitized seal of claim 12, wherein said one-piece reinforcing shell, including said rollover means, is formed of a single unitary stamping.

25. The unitized seal of claim 24, wherein said rollover means is a free end portion of said single unitary stamping.

26. The unitized seal of claim 25, wherein said free end portion is provided with a reduced thickness for enabling rolling thereof from an original condition enabling assembly of said reinforcing shell with said wear sleeve to a rolled-over condition wherein said operating of the unitizing means to prevent disassembly of said wear sleeve from said reinforcing shell result.

* * * * *